United States Patent
Hashimoto et al.

(10) Patent No.: US 7,165,512 B2
(45) Date of Patent: Jan. 23, 2007

(54) METHOD FOR CONTROLLING COMPRESSION IGNITION INTERNAL COMBUSTION ENGINE

(75) Inventors: Kohtaro Hashimoto, Wako (JP); Kohjiroh Aimoto, Wako (JP); Fumiaki Ikegawa, Wako (JP); Takahiro Gunji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/349,103

(22) Filed: Feb. 8, 2006

(65) Prior Publication Data
US 2006/0185625 A1    Aug. 24, 2006

(30) Foreign Application Priority Data
Feb. 24, 2005    (JP) .............................. 2005-049508

(51) Int. Cl.
*F02B 43/08*    (2006.01)
(52) U.S. Cl. .......................................... 123/3; 123/1 A
(58) Field of Classification Search ..................... 123/3, 123/1 A, 304, 198 A, 27 R
See application file for complete search history.

(56) References Cited

U.S. PATENT DOCUMENTS

| | | | | |
|---|---|---|---|---|
| 4,170,960 A | * | 10/1979 | Germack et al. | 123/198 A |
| 4,330,304 A | * | 5/1982 | Gorman | 44/322 |
| 4,398,505 A | * | 8/1983 | Cahill | 123/1 A |
| 4,541,835 A | * | 9/1985 | Norton et al. | 44/326 |
| 4,862,836 A | * | 9/1989 | Chen et al. | 123/3 |
| 4,884,531 A | * | 12/1989 | Degnan et al. | 123/3 |
| 6,676,715 B1 | * | 1/2004 | Henry et al. | 44/329 |
| 6,827,047 B1 | * | 12/2004 | Qian et al. | 123/3 |
| 6,981,472 B1 | * | 1/2006 | Bromberg et al. | 123/3 |
| 7,017,530 B1 | * | 3/2006 | Hashimoto et al. | 123/1 A |
| 2003/0168024 A1 | * | 9/2003 | Qian et al. | 123/3 |
| 2004/0099226 A1 | * | 5/2004 | Bromberg et al. | 123/3 |
| 2006/0180099 A1 | * | 8/2006 | Aimoto et al. | 123/1 A |

FOREIGN PATENT DOCUMENTS

| | | |
|---|---|---|
| JP | 2000-213444 A | 8/2000 |
| JP | 2001-355471 A | 12/2001 |

\* cited by examiner

*Primary Examiner*—Stephen K. Cronin
*Assistant Examiner*—Ka Chun Leung
(74) *Attorney, Agent, or Firm*—Arent Fox PLLC

(57) ABSTRACT

The present invention provides a method for controlling a compression ignition internal combustion engine, which can easily cope with a wide range of demand load with the use of a single fuel. The method includes: providing fuel 2 containing an ignition enhancer for the compression ignition internal combustion engine 1; thermally decomposing a part of the ignition enhancer included in the fuel 2 to make the fuel 2 less ignitable as the compression ignition internal combustion engine has a higher demand load; and supplying the fuel having the a lower ignitability to the compression ignition internal combustion engine 1. The fuel capable of compression self-ignition is a hydrocarbon-based fuel. The ignition enhancer is one selected from the group consisting of an organic peroxide, a nitric ester, a nitrite ester and an azo compound. The organic peroxide is di-tert-butyl peroxide. The nitric ester is 2-ethylhexyl nitrate. The nitrite ester is n-pentyl nitrite. The azo compound is 2,2-azobis(2,4-dimethylvaleronitrile). The ignition enhancer is thermally decomposed in an electric furnace.

9 Claims, 1 Drawing Sheet

METHOD FOR CONTROLLING COMPRESSION IGNITION INTERNAL COMBUSTION ENGINE

BACKGROUND OF THE INVENTION

1. Field of the Invention

The present invention relates to a method for controlling a compression ignition internal combustion engine.

2. Description of the Related Art

In recent years, in order to reduce a fuel efficiency and discharge of an internal combustion engine, a compression ignition internal combustion engine represented by a homogeneous-charged compression ignition internal combustion engine has been studied. However, the above described compression ignition internal combustion engine has difficulty in controlling the timing of ignition, in contrast to a spark ignition type internal combustion engine. In addition, the above described compression ignition internal combustion engine tends to cause knocking when a demand load of the engine is increased in case where fuel with high ignitability is used, and tends to cause flame off when a demand of the engine is decreased in case where fuel with low ignitability is used.

In order to solve the above described problem, a technology has been conventionally known which provides a fuel with high ignitability and another fuel with low ignitability, mixes the fuels, and supplies the mixture to the above described compression ignition internal combustion engine (see, for instance, Japanese Patent Laid-Open No. 2001-355471). According to the above described technology, the compression ignition internal combustion engine can be stably operated in a wide range of demand load, by adjusting a mixing ratio of the fuels depending on the demand load thereof. However, the above described technology requires the internal combustion engine system to comprise a plurality of tanks for separately accommodating each of the fuels with high ignitability and low ignitability.

In contrast, a technology has been known which uses a single fuel, and a part of the fuel is partially oxidized to produce an ignition inhibitor when the demand load of the compression ignition internal combustion engine is increased (see, for instance, Japanese Patent Laid-Open No. 2000-213444). In the above described technology, specifically, a part of a hydrocarbon-based fuel such as gas oil is partially oxidized to produce an ignition inhibitor such as formaldehyde, and has an advantage that only one fuel tank is required in the internal combustion engine.

However, this technology has an inconvenience of requiring a long period of time and a high temperature for a reaction of partially oxidizing the above described hydrocarbon such as gas oil to produce formaldehyde.

SUMMARY OF THE INVENTION

An object of the present invention is to provide a method of controlling a compression ignition internal combustion engine which uses a single fuel but can easily cope with a wide range of demand load, so as to solve the above inconvenience.

In order to achieve the above object, a method in the present invention for controlling a compression ignition internal combustion engine in which an oxygen-containing gas and a fuel capable of compression self-ignition are introduced into a cylinder and are compressed for self-ignition, the method comprising the steps of: preparing fuel containing an ignition enhancer in the compression ignition internal combustion engine; lowering the ignitability of the fuel in accordance with the increase of the demand load of the compression ignition internal combustion engine, by thermally decomposing one part of the ignition enhancer included in the fuel; and supplying the fuel having the a lower ignitability to the compression ignition internal combustion engine.

A method according to the present invention employs the above described fuel which includes the above described ignition enhancer; as a result, has high ignitability and does not cause flame off and the like even when the demand load of the compression ignition internal combustion engine is decreased; and can stably operate the compression ignition internal combustion engine.

On the other hand, a method according to the present invention thermally decomposes one part of the above described ignition enhancer, when the demand load of the compression ignition internal combustion engine is high. The ignition enhancer does not need to be reacted for a long period of time at a high temperature, in contrast to partial oxidation of hydrocarbon and the like, and is decomposed in a short time when heated.

When the above described ignition enhancer is decomposed, the ignitability of the above described fuel is relatively lowered in comparison with that containing the ignition enhancer of a not-yet-decomposed state. Accordingly, by supplying the fuel with relatively lower ignitability due to the thermal decomposition of the above described ignition enhancer, to the compression ignition internal combustion engine, a method according to the present invention can stably operate the compression ignition internal combustion engine without causing knocking or the like, even when the demand load of the compression ignition internal combustion engine is high.

The above described fuel capable of compression self-ignition includes a hydrocarbon-based fuel including: an existing fuel such as gas oil, kerosene and gasoline; and a synthetic fuel such as dimethyl ether and heptane. Particularly, the above described heptane is included in a naphtha fraction obtained through a liquefaction (GTL: gas to liquid) process of a natural gas, has a low boiling point, is easily synthesized, and accordingly is suitable for the fuel for a compression ignition internal combustion engine.

The above described ignition enhancer for the above described fuel includes one compound selected, for instance, among di-tert-butyl peroxide which is an organic peroxide, 2-ethylhexyl nitrate which is a nitric ester, n-pentyl nitrite which is a nitrite ester, and 2,2-azobis(2,4-dimethylvaleronitrile) which is an azo compound.

DETAILED DESCRIPTION OF THE PREFERRED EMBODIMENTS

In the next place, embodiments according to the present invention will be described in further detail with reference to the attached drawings.

Figure 1:
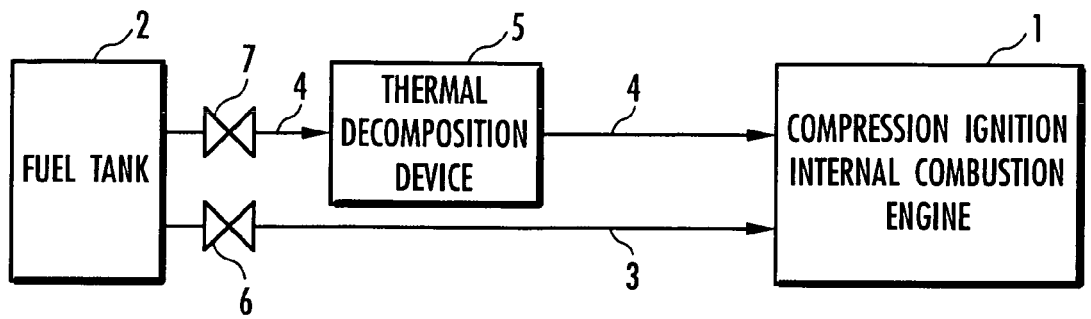
FIG. 1 is a block diagram showing one embodiment of a method for controlling a compression ignition internal combustion engine according to the present invention.

A control method according to the present embodiment can be conducted by using a compression ignition internal combustion engine 1 shown in FIG. 1. The compression ignition internal combustion engine 1 has a fuel tank 2 which accommodates a fuel containing an ignition enhancer and is connected to the compression ignition internal combustion engine 1 through feeding ducts 3 and 4. The feeding duct 3 is connected to the compression ignition internal combustion engine 1, and the feeding duct 4 has a thermal decomposition device 5 for thermally decomposing the above described ignition enhancer on the way to the combustion engine 1. The feeding ducts 3 and 4 have respectively flow control valves 6 and 7 installed on the way closer to the fuel tank 2 (installed in between the fuel tank 2 and the thermal decomposition device 5, in the feeding duct 4).

A fuel to be accommodated in the fuel tank 2 includes, for instance, a hydrocarbon such as heptane ($C_7H_{16}$); and the above described ignition enhancer includes one compound selected from di-tert-butyl peroxide which is an organic peroxide, 2-ethylhexyl nitrate which is a nitric ester, n-pentyl nitrite which is a nitrite ester, and 2,2-azobis(2,4-dimethylvaleronitrile) which is an azo compound. This method can employ an electric furnace for the thermal decomposition device 5.

At first, when the compression ignition internal combustion engine 1 has a low demand load, a control method according to the present embodiment closes the flow control valve 7, opens only the flow control valve 6, and directly supplies the above described fuel accommodated in the fuel tank 2 to the compression ignition internal combustion engine 1 through the feeding duct 3. Hence, the above described fuel has improved ignitability because of including the above described ignition enhancer, and accordingly does not cause flame off or the like, so that the control method can stably operate the compression ignition internal combustion engine 1.

Next, when the compression ignition internal combustion engine 1 has a high demand load, this control method opens a flow control valve 7 at a rate determined by the magnitude of the demand load, and supplies a part of the fuel accommodated in the fuel tank 2 to the compression ignition internal combustion engine 1 through the thermal decomposition device 5. Hence, the above described fuel has a lower ignitability in comparison with the fuel including the ignition enhancer as it is, because the above described ignition enhancer is decomposed due to heating of the above described fuel in the thermal decomposition device 5.

As a result, the fuel which contains the above described ignition enhancer and has improved ignitability is supplied to the compression ignition internal combustion engine 1 through the feeding duct 3, and the fuel which has the lower ignitability due to the thermal decomposition of the above described ignition enhancer is supplied thereto through the feeding duct 4. At this moment, the control method controls openings of flow control valves 6 and 7 to appropriately adjust a ratio of the fuel having the improved ignitability to the fuel having the lower ignitability, and thereby lowers the ignitability of the fuel supplied to the compression ignition internal combustion engine 1 depending on the magnitude of the demand load of the compression ignition internal combustion engine 1. Accordingly, the control method can stably operate the compression ignition internal combustion engine 1 without causing knocking or the like, even when the compression ignition internal combustion engine 1 has a high demand load.

Figure 2:
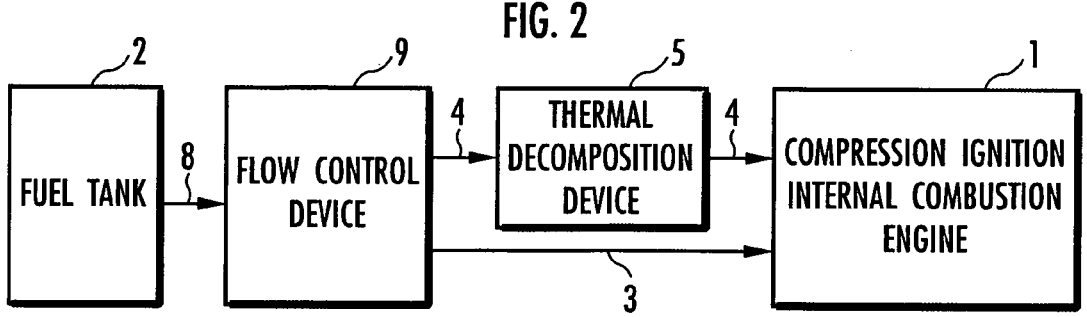
FIGS. 2 to 4 are block diagrams showing other embodiments of a method for controlling a compression ignition internal combustion engine according to the present invention.

A compression ignition internal combustion engine 1 shown in FIG. 1 has flow control valves 6 and 7 installed in feeding ducts 3 and 4, to adjust a ratio of the fuel having improved ignitability to the fuel having the lower ignitability. As shown in FIG. 2, however, it is also acceptable to provide a flow control device 9 between the fuel tank 2 and the thermal decomposition device 5, where the flow control device 9 is connected to the fuel tank 2 through a main feeding duct 8, and to branch the feeding ducts 3 and 4 from the flow control device 9. In the compression ignition internal combustion engine 1 shown in FIG. 2, the flow control device 9 adjusts the ratio of the fuel having the improved ignitability to the fuel having the lower ignitability.

Figure 3:
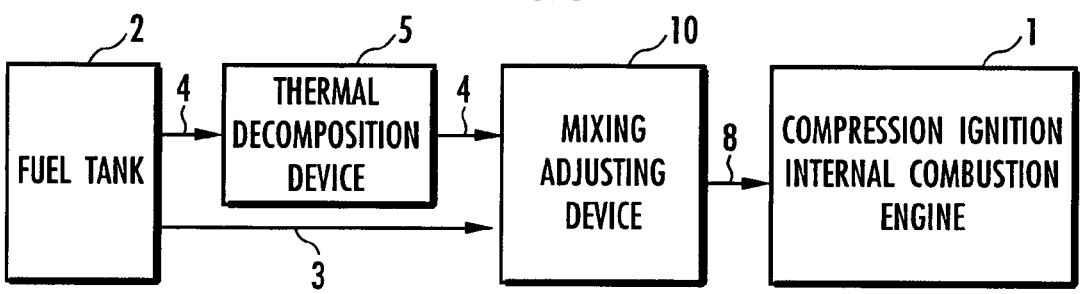

It is also acceptable to provide a mixing adjusting device 10, as shown in FIG. 3, between the thermal decomposition device 5 and the compression ignition internal combustion engine 1, where the mixing adjusting device 10 is connected with feeding ducts 3 and 4, and to connect the mixing adjusting device 10 with the compression ignition internal combustion engine 1 through the main feeding duct 8. In the compression ignition internal combustion engine 1 shown in FIG. 3, the mixing adjusting device 10 mixes the fuel having improved ignitability with the fuel having the lower ignitability at a predetermined rate, and supplies them to the compression ignition internal combustion engine 1.

Figure 4:
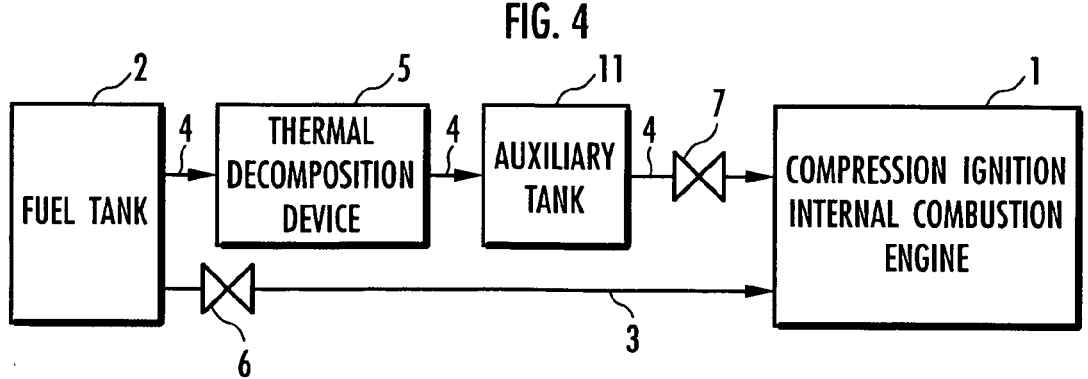

Furthermore, it is acceptable to provide an auxiliary tank 11 for accommodating the fuel having the lower ignitability, as shown in FIG. 4, between the thermal decomposition device 5 in the feeding duct 4 and the compression ignition internal combustion engine 1, and to provide the flow control valve 7 between the auxiliary tank 11 and the compression ignition internal combustion engine 1. The compression ignition internal combustion engine 1, shown in FIG. 4, can quickly cope with a higher demand load of the compression ignition internal combustion engine 1, by supplying the fuel having the lower ignitability, which has been previously accommodated in the auxiliary tank 11, to the compression ignition internal combustion engine 1 through the flow control valve 7. Here, the ratio of the fuel having the improved ignitability to the fuel having the lower ignitability is controlled by adjusting the openings of the flow control valves 6 and 7.

A control method according to the present embodiment can employ a fuel consisting of 98 wt. % heptane as the main fuel and 2 wt. % di-tert-butyl peroxide as the ignition enhancer, a fuel consisting of 99 wt. % kerosene as the main fuel and 1 wt. % di-tert-butyl peroxide as the ignition enhancer, or the like, as the fuel accommodated in the fuel tank 2.

In the next place, examples according to the present invention will be shown.

EXAMPLE 1

In the present example, ignitabilities for a case (fuel A) in which di-tert-butyl peroxide is not decomposed and for a case (fuel B) in which di-tert-butyl peroxide has been thermally decomposed were compared with the fuel consisting of 98 wt. % heptane as the main fuel and 2 wt. % di-tert-butyl peroxide as the ignition enhancer. The fuel B in which di-tert-butyl peroxide has been thermally decomposed was prepared by passing the fuel A in which di-tert-butyl peroxide is not decomposed in the thermal decomposition device 5, making the fuel A stay in the thermal decomposition device 5 at 280° C. for one second to thermally decompose the same, and then cooling the same for liquefaction. As a result of measurement with gas chromatography on the thermally decomposed rate of di-tertbutyl peroxide in the fuel B prepared in the above described condition, it was confirmed that the di-tert-butyl peroxide was all thermally decomposed, and in other words the thermal decomposition rate was 100%.

The above described ignitabilities were compared on the ignition-delayed period, which was measured as a period of time after each of fuels A and B was injected into a combustion chamber with a pressure of 2 MPa and a temperature of 500° C. until the pressure increased by 0.02 MPa. As the ignition-delayed period is shorter, the ignitability is higher.

For comparison, the ignition-delayed period was also measured for the fuel C which does not contain di-tert-butyl peroxide as an ignition enhancer at all but consists only main fuel, in a method similar to above. The results are shown in Table 1.

EXAMPLE 2

In the present example, ignitabilities for a case (fuel A) in which di-tert-butyl peroxide is not decomposed and for a case (fuel B) in which di-tert-butyl peroxide has been thermally decomposed were compared in the completely same condition as in Example 1, except that the used fuel contains 99 wt. % kerosene as a main fuel and 1 wt. % di-tert-butylperoxide as an ignition enhancer.

For comparison, the ignition-delayed period was also measured on the fuel C which does not contain di-tert-butyl peroxide as an ignition enhancer at all but consists only main fuel, in a method similar to above. The results are shown in Table 1.

TABLE 1

|  | Ignition-Delayed time (ms) | |
| --- | --- | --- |
|  | Example 1 | Example 2 |
| Fuel A | 3.65 | 5.43 |
| Fuel B | 5.73 | 7.72 |
| Fuel C | 5.71 | 7.68 |

In Table 1, fuel A which contains a main fuel and di-tert-butyl peroxide as the ignition enhancer obviously shows a shorter ignition-delayed period than fuel C which does not contain the ignition enhancer at all and consists only main fuel, and shows an effect of improving ignitability.

On the other hand, the fuel B which has thermally decomposed di-tert-butyl peroxide contained in the fuel A obviously shows an approximately equal ignition-delayed period to fuel C which does not contain the ignition enhancer at all and consists only main fuel, and shows an effect of lowering ignitability.

In the present embodiment, the used fuel contains di-tert-butyl peroxide as an ignition enhancer, but may contain any one of 2-ethylhexyl nitrate which is a nitric ester, n-pentyl nitrite which is a nitrite ester, and 2,2-azobis(2,4-dimethylvaleronitrile) which is an azo compound, as the ignition enhancer. In addition, a ratio of the above described ignition enhancer to the above described main fuel has only to be in such a range as to provide an effect of improving ignitability by containing the ignition enhancer, and is not limited to the ratio shown in the above described Examples 1 and 2.

In addition, in Examples 1 and 2, the above described ignition enhancer is thermally decomposed in the thermal decomposition device 5 at 280° C. in one second of residence time, but any condition of thermal decomposition may be suitable if the ignition enhancer can be thermally decomposed within a practical period of time. The condition is not limited to the temperatures and periods of time indicated above.

What is claimed is:

1. A method for controlling a compression ignition internal combustion engine in which an oxygen-containing gas and a fuel capable of compression self-ignition are introduced into a cylinder and are compressed for self-ignition, the method comprising the steps of:
   providing a fuel containing an ignition enhancer for the compression ignition internal combustion engine;
   thermally decomposing a part of the ignition enhancer included in the fuel to make the fuel less ignitable as the compression ignition internal combustion engine has a higher demand load; and
   supplying the fuel having the lower ignitability to the compression ignition internal combustion engine.

2. The method for controlling the compression ignition internal combustion engine according to claim 1, wherein the fuel capable of compression self-ignition is a hydrocarbon-based fuel.

3. The method for controlling the compression ignition internal combustion engine according to claim 2, wherein the hydrocarbon-based fuel is one selected from the group consisting of gas oil, kerosene, gasoline, dimethyl ether and heptane.

4. The method for controlling the compression ignition internal combustion engine according to claim 1, wherein the ignition enhancer is one selected from the group consisting of an organic peroxide, a nitric ester, a nitrite ester and an azo compound.

5. The method for controlling the compression ignition internal combustion engine according to claim 4, wherein the organic peroxide is di-tert-butyl peroxide.

6. The method for controlling the compression ignition internal combustion engine according to claim 4, wherein the nitric ester is 2-ethylhexyl nitrate.

7. The method for controlling the compression ignition internal combustion engine according to claim 4, wherein the nitrite ester is n-pentyl nitrite.

8. The method for controlling the compression ignition internal combustion engine according to claim 4, wherein the azo compound is 2,2-azobis(2,4-dimethylvaleronitrile).

9. The method for controlling the compression ignition internal combustion engine according to claim 1, wherein the ignition enhancer is thermally decomposed in an electric furnace.

* * * * *